United States Patent Office 3,586,687
Patented June 22, 1971

3,586,687
PROCESS FOR PREPARING 2-[(METHYL-SULFINYL) ACETYL]PYRIDINE
George A. Conrad, Jr., Irvington, N.J., assignor to Warner-Lambert Pharmaceutical Company, Morris Plains, N.J.
No Drawing. Filed Feb. 6, 1969, Ser. No. 797,243
Int. Cl. C07d 31/48
U.S. Cl. 260—294.8               3 Claims

ABSTRACT OF THE DISCLOSURE

The present invention relates to an improved process for the production of 2-[(methylsulfinyl)acetyl]pyridine. This process utilizes a relatively low temperature reaction in which anhydrous dimethylsulfoxide and ethyl picolinate are first combined and sodium hydride in mineral oil is then added portion-wise while maintaining a temperature of less than 70° C., typically 20° to 30° C.

---

The present invention relates to a novel process; and more particularly, the present invention relates to an improved process for the production of 2-[(methylsulfinyl) acetyl]pyridine of the formula:

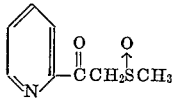

This compound is useful as an immunosuppressive agent. The use of this compound as an immunosuppressive agent is more specifically disclosed in copending U.S. application Ser. No. 773,941, filed Nov. 6, 1968. Generally speaking, this compound inhibits those immune reactions classified as cell-mediated, delayed type hypersensitivities. These latter include: the late secondary migratory lesions in rats injected with Freund's adjuvant, in accordance with the techniques described in Brit. J. Pharmacol. 21: 127–136 and Brit. J. Pharmacol. 24: 632–640 (1965); the sensitized response to bacterial endotoxin shown in the spleen-cell assay, Jerne et al., Cell-Bound Antibodies, Wistar Institute Press, 1963, p. 109; skin transplant rejection in mice and rats and mammary gland rejection in rats, Billingham, Transplantation of Cells and Tissues, Wistar Institute Press, 1961, p. 1; contact and protein hypersensitivities in guinea pigs, rabbits and rats, Uhr Physiol. Rev. 46: 359–419. The compound of this invention, as well as its corresponding acid addition salts, N-oxides and quaternary ammonium salts, showed, at a dosage range of about 1 to 1000 mg./kg., typically 25 to 100 mg./kg., three or four times daily, orally or by injection, depending on the host, effectiveness in suppressing these various expressions of the delayed hypersensitivity immunological response.

Among the delayed hypersensitivity immunological responses, in which the compound of this invention is indicated, are for example, rheumatoid arthritis, ulcerative colitis, allergies, skin and organ transplants, systemic lupus, glomerular nephritis and the like. As far as toxicity is concerned, the compound of this invention has extremely low toxicity, for example, oral administration at a dose of 5 g./kg. or intravenous injection at a dose of 1 g./kg. to mice produces no deaths.

In order to use this compound, it may be combined with inert pharmaceutical excipients, such as lactose, mannitol, starch, and formulated into dosage forms such as tablets, capsules and the like. For parenteral administration, this compound may be formulated with an inert, parenterally acceptable vehicle, such as water, saline, sesame oil and the like. These various pharmaceutical dosage forms are compounded by methods well known to the pharmacist's art.

The process disclosed in said application for the production of this compound involves the addition of sodium hydride in mineral oil to anhydrous dimethylsulfoxide and heating to a temperature for example of about 75° to 80° C. to form the methylsulfinyl carbanion. Ethyl picolinate is then added to the carbanion slurry to form the desired 2-[(methylsulfinyl)acetyl]pyridine. Such a process, while satisfactory on a laboratory scale, does present many problems when it is scaled up to produce this therapeutically important compound on a commercial basis. For example, an explosion was reported in Chemical and Engineering News, dated Apr. 11, 1966, at page 48, during the preparation of the same methylsulfinyl carbanion.

Furthermore, on a production scale the consistency of the reaction becomes such as to make stirring difficult with localized heating and subsequent decomposition of the desired methylsulfinyl carbanion.

I have now found an improved process which not only avoids hazardous problems, but also can be adapted on a production scale. Broadly speaking, this improved process is practiced by employing a relatively low reaction temperature in which the anhydrous dimethylsulfoxide and ethyl picolinate are first combined. Sodium hydride, preferably as a dispersion in mineral oil is then added to the mixture portionwise, while maintaining a temperature of about less than 70° C., typically 20° to 30° C.

I have found that utilizing this improved process, the reaction proceeds much less vigorously than the previously described process. Consequently, the reaction can be easily controlled and greatly decreases the hazards of an uncontrollable reaction. Because of the reaction being readily controllable, the present process is a process of choice for commercial production. In addition, I have also found this improved process gives better yields of higher quality of this therapeutically important compound.

While the aforesaid process has been described with more specific reference, for the production of the 2-[(methylsulfinyl)acetyl]pyridine, it is readily apparent to those skilled in the art that such processing is readily applicable for the production of the other pyridyl ketosulfoxides described and disclosed in the said copending application.

The following example is included in order further to illustrate the invention.

EXAMPLE 392 ml. of anhydrous dimethylsulfoxide and 50 grams (0.33 M) ethyl picolinate are combined in a reaction vessel. 26.7 grams of a 60% suspension of sodium hydride in mineral oil (16 grams of sodium hydride or 0.666 M) at a temperature of 23° to 31° C. is added over a two hour period to the reaction vessel with stirring. The mixture is then further stirred at a temperature of not more than 25° C. over a period of five hours. At the conclusion of this period the mixture is then decomposed in ice and water, extracted with ether and the aqueous layer adjusted to a pH of 7 with concentrated ·HCl. The mixture is then chloroform extracted, dried over sodium sulfate and stripped to remove the chloroform. The residue is chilled and the product obtained is recrystallized from ethyl acetate to yield 2-[(methylsulfinyl)acetyl]pyridine. The melting point is 80° to 81° C., with yields up to 74%.

I claim:
1. In a process for the production of 2-[(methylsulfinyl)acetyl]pyridine by treating sodium hydride and dimethylsulfoxide at a temperature of about 70° C. and adding ethyl picolinate, the improvement which comprises first combining dimethylsulfoxide and ethyl picolinate and then adding sodium hydride in the form of a mineral oil suspension at a temperature range of from 20° C. to 70° C.

2. The process according to claim 1 wherein the sodium hydride is added in the form of a 60% suspension in mineral oil.

3. A claim according to claim 2 wherein the sodium hydride is added at a temperature of about 20° to 30° C.

References Cited

UNITED STATES PATENTS 3,288,860  11/1966  Lyness et al. _____ 260—294.8

OTHER REFERENCES

Russell et al., J. Org. Chem., vol. 31, p. 248, February 1966.

ALAN L. ROTMAN, Primary Examiner

U.S. Cl. X.R.

260—999